Aug. 27, 1968      J. B. GUIN      3,398,686

LIQUID SHOCK MOTOR AND PUMPING DEVICE

Filed May 13, 1966      7 Sheets-Sheet 1

INVENTOR.

Joel B. Guin

Aug. 27, 1968   J. B. GUIN   3,398,686
LIQUID SHOCK MOTOR AND PUMPING DEVICE
Filed May 13, 1966   7 Sheets-Sheet 2
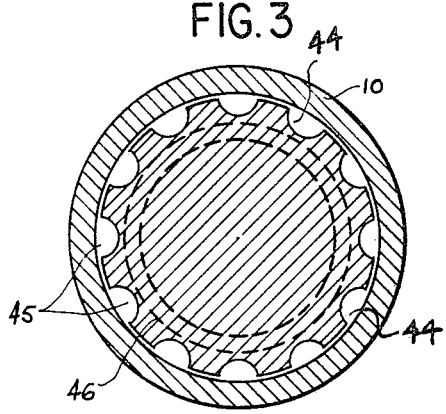
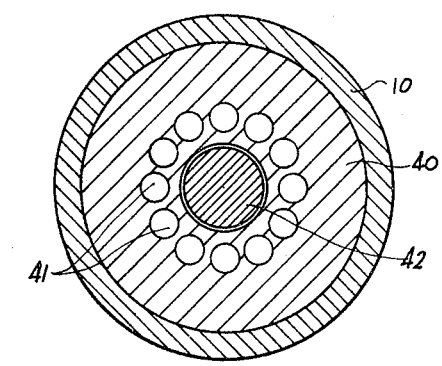
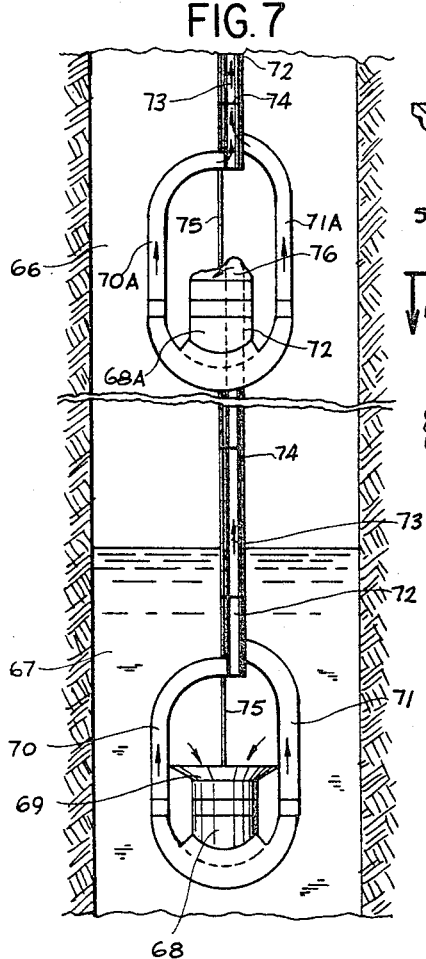
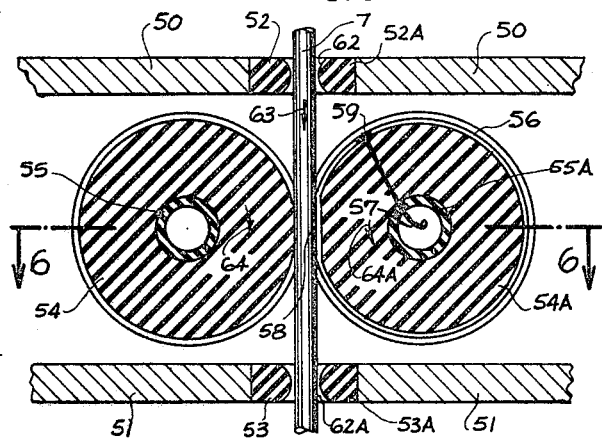
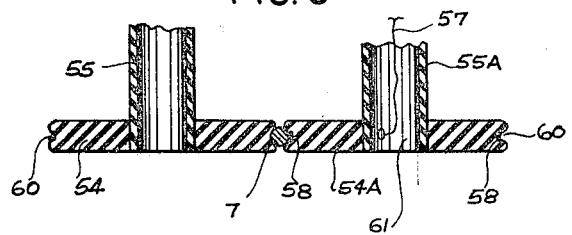
INVENTOR.
Joel B. Guin

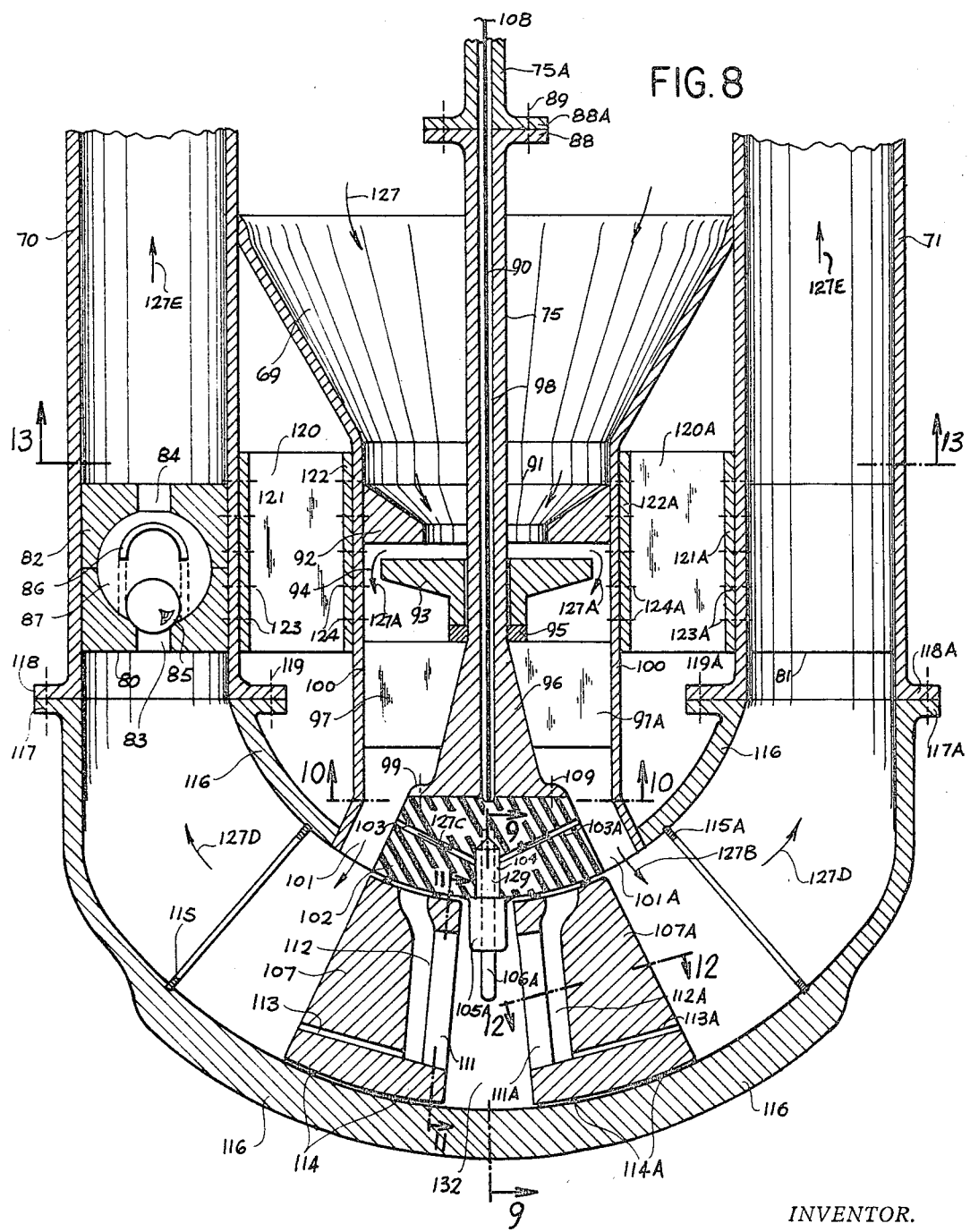

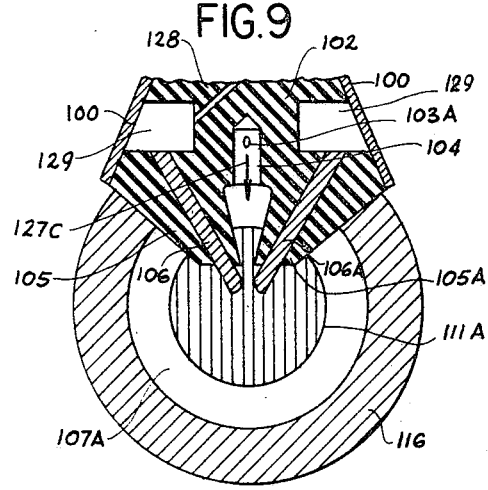
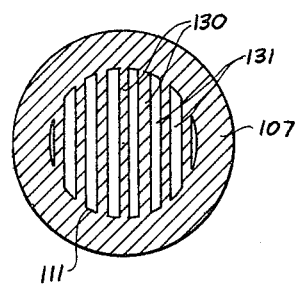
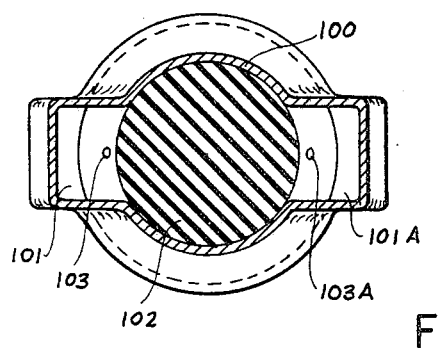
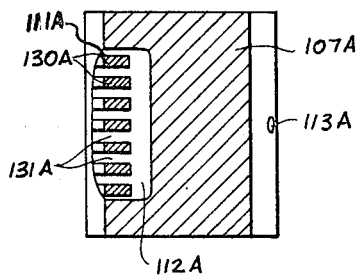
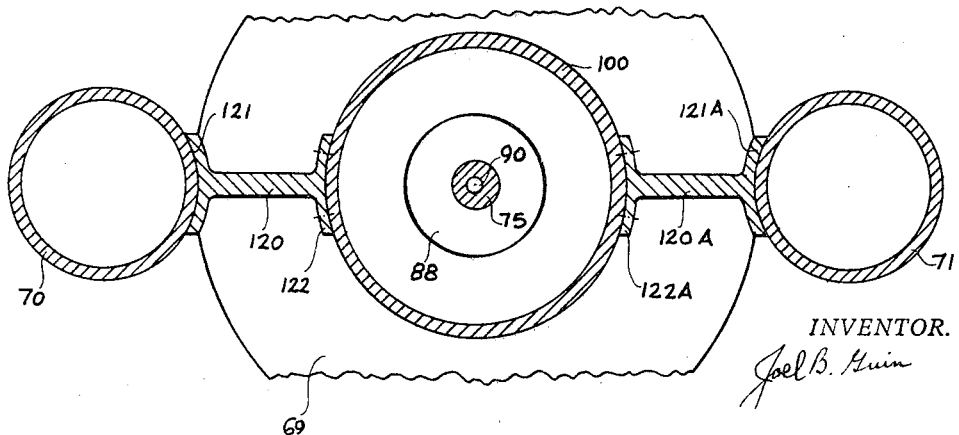

INVENTOR.
Joel B. Guin

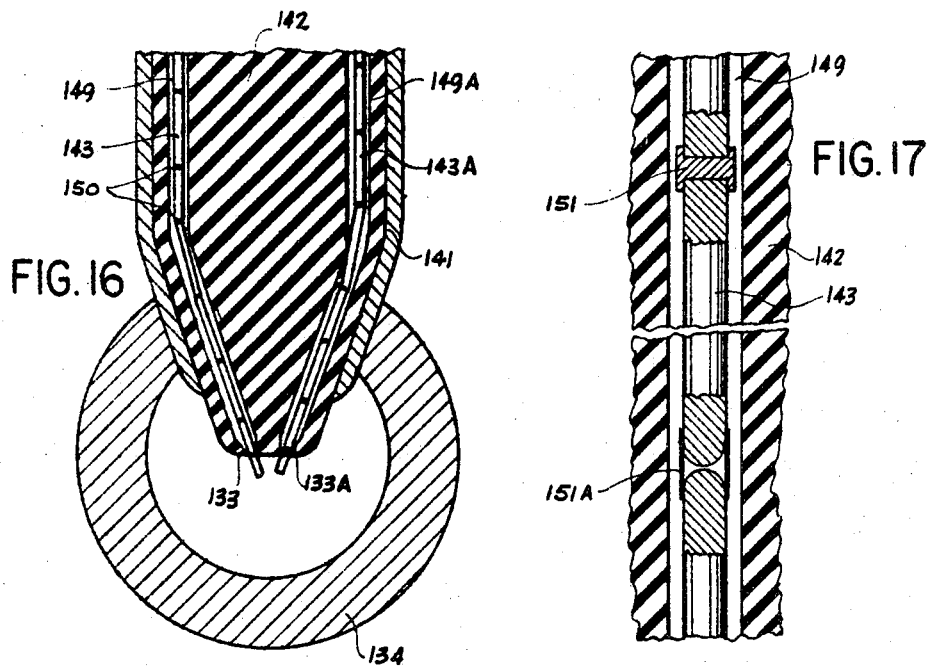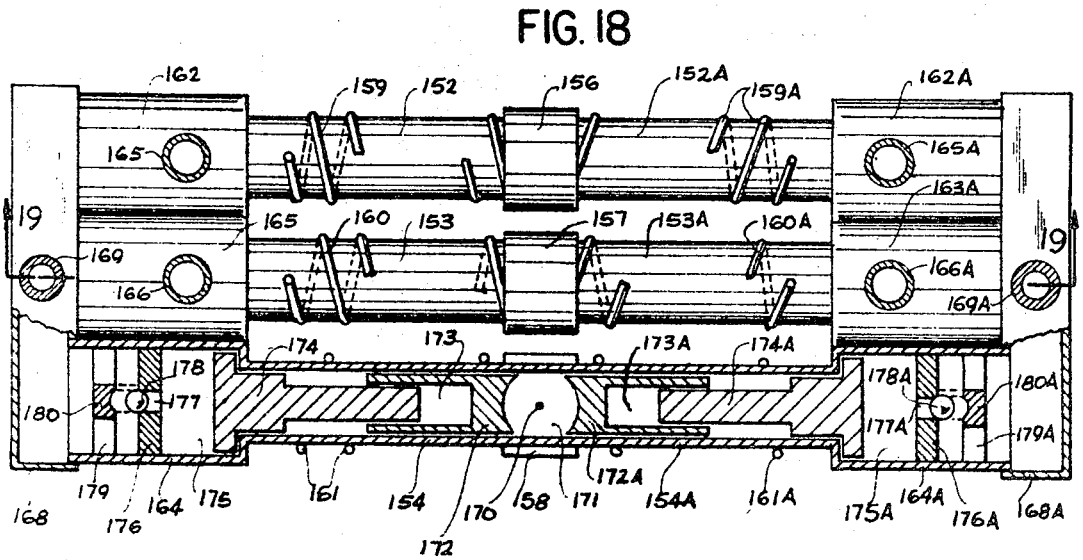

3,398,686
LIQUID SHOCK MOTOR AND
PUMPING DEVICE
Joel B. Guin, 148 E. 48th St.,
New York, N.Y. 10017
Filed May 13, 1966, Ser. No. 549,875
4 Claims. (Cl. 103—1)

ABSTRACT OF THE DISCLOSURE

Pistons are movably disposed adjacent the shock chamber to drive the liquid in the housing through outlets leading therefrom when the vaporization of liquid in the shock chamber forces the pistons outward. Each piston is penetrated by channels that let cool liquid into the shock chamber to condense the vapor formed therein after each spark discharge.

Secondary condensing channels lead from the main liquid channel into the shock chamber to expedite the condensation therein by letting in cool liquid immediately after each spark discharge.

One-way check valves are located across the inlet channels into the shock chamber to prevent back-flow during the spark discharge. One-way ball valves are located across the outlet channels from the shock chamber to prevent back-flow before and after the spark discharge.

Means are included for joining electrodes into a string by flexible electrically conductive connecting means. Each of two such strings are held by an electrode channel of insulating material. The two channels hold the bottom electrodes of the two strings in accurate position to form a spark gap. New electrodes thus are available as soon as the bottom one is consumed.

---

This invention relates to a shock pump and motor device.

Economic factors, such as the cost of electric energy, may limit the pump application for some time to come to special situations such as: pumping water from mines and other deep holes, for pumping from various depths in oceans and other bodies of water, for sump pumps in basements, etc. that are used very seldom, and for other places where energy cost is a smaller consideration than having a cheap, reliable, low-volume pump. Similar factors may limit the motor application to difficult locations demanding a special motor and others where ordinary motors are impracticable or unfeasible.

The chief advantages of this device are: its flexibility, adaptability, range or sizes and materials in construction and range of production costs; the number of separate units that may be easily assembled in one operation, with controls that can use one, a few, or all the units at any one time; its installability in unusual or difficult locations where ordinary devices are inadequate or too expensive; and the fewness of moving parts with resulting reliability of operation and low maintenance costs.

These objects and advantages will become apparent when the description that follows is read in conjunction with the attached drawings, in which:

FIG. 3 is a horizontal section along line 3—3 in FIG. 2 through the valve closure plate.

FIG. 4 is a horizontal section along line 4—4 in FIG. 2A showing the openings in the valve structure.

FIG. 5 is a vertical section through the electrode feeding system.

FIG. 6 is a horizontal section along line 6—6 in FIG. 5.

FIG. 7 is a schematic figure in which two pumps, one above the other, force liquid upward from a deep hole; any number of these shock pumps can be placed above each other.

FIG. 8 is a vertical section through the lower shock pump shown in FIG. 7.

FIG. 9 is a vertical section along line 9—9 in FIG. 8 showing the arrangement of the two electrodes.

FIG. 10 is a horizontal section along line 10—10 in FIG. 8 showing the two inlet channels.

FIG. 11 is a vertical section along line 11—11 in FIG. 8 showing a grid at the piston face, that serves as a pressure dispersion and piston cooling device.

FIG. 12 is a horizontal section along line 12—12 in FIG. 8 showing the position of the grid and a channel through which water can flow to condense the stream in the discharge chamber after the discharge.

FIG. 13 is a horizontal section along line 13—13 in FIG. 8 showing the arrangement of the inlet and the two exit cylinders.

FIG. 16 is a vertical section along line 16—16 in FIG. 14 showing the arrangement of the electrodes and the electrode channels.

FIG. 17 shows a part of an electrode channel into which are placed electrode sections connected by flexible conducting connections.

FIG. 18 is another modification of the shock pump consisting of an array of tubes shown in horizontal position each having its own discharge chamber.

Figure 1:
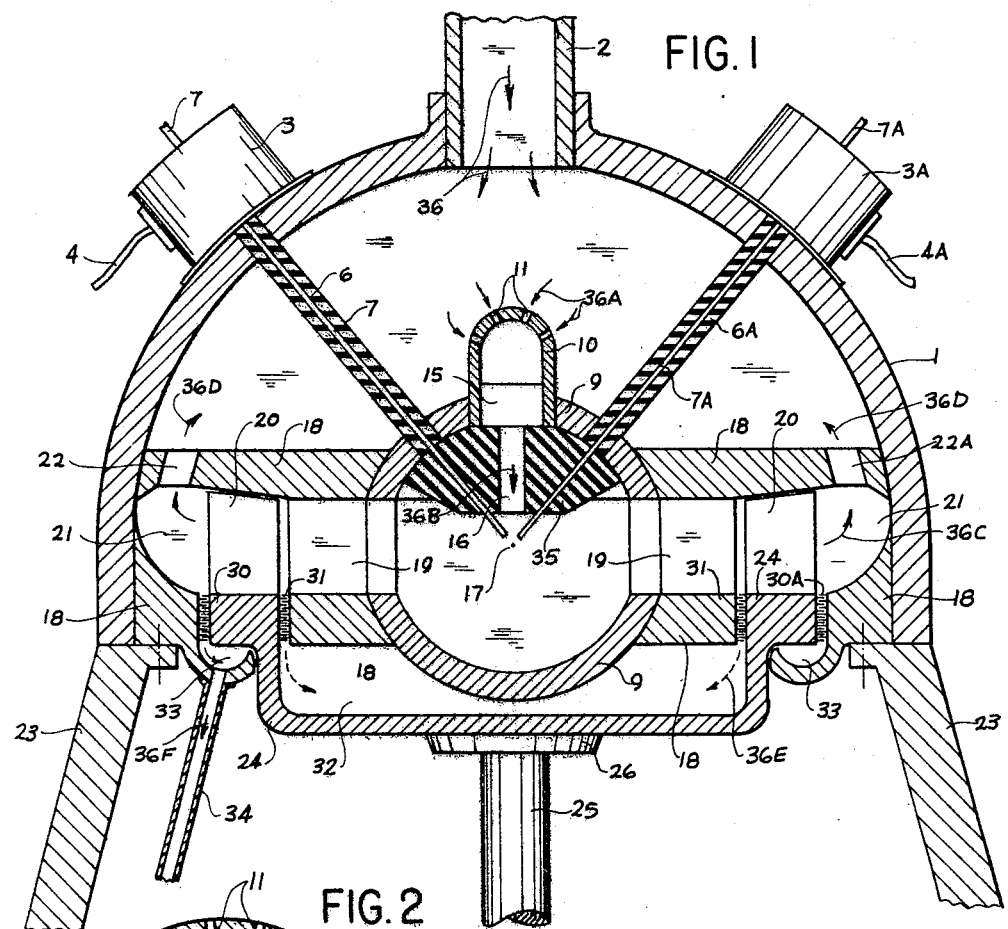
FIG. 1 is a vertical section through a device in which a turbine is driven by water receiving kinetic energy through an electrode discharge within the water.

FIG. 1 is a vertical section through a center shock-turbine consisting of half-sphere 1 having an opening at the top into which inlet channel 2 is placed, and central structure 18 welded to the inner walls thereof. The latter half-sphere is supported by structure 23. In the center of structure 18 is placed shock chamber 9 into which extend two electrodes 7 and 7A from the left and right respectively. Electrodes are fed into chamber 9 by means of electrode feeding devices 3 and 3A into which electrical energy flows via cables 4 and 4A respectively. These cables are connected to an energy source such as a generator-capacitor unit (not shown). Within the upper portion of half-sphere 1 the electrodes are covered by channels 6 and 6A, and within the shock chambers they are supported by insulating structure 35. At the top of shock chamber 9 is placed inlet diffuser 10 having openings 11; around chamber 9 are placed stator blades 19. Following the stator blades are rotor blades 20 fastened to rotor structure 24 which is connected to shaft 25 by flange 26. Arrows are drawn to indicate water flow. Water (arrows 36) flows through channel 2 and then enters inlet-diffuser 10 (arrows 36A) and flows through valve 15 and channel 16 (arrows 36B) into shock chamber 9. At point 17 the discharge occurs and drives the water through stator and rotor blades 19 and 20. Valve 15 prevents backflow of water into half-sphere 1. Part of the water will leak out through labyrinth sealings 30 and 31. It will either flow into channel 33 and out thru pipe 34 or into rotor structure 24 (arrow 36E) till full. In most applications leakage will not matter since there is too much water already and water is used to pump water. In deep holes, outside pressure will reduce leakage. From the rotor blades the water flows through channel 21 and one-way valves 22 and 22A (open in flow direction) back into the halfsphere (arrow 36D).

Figure 2:
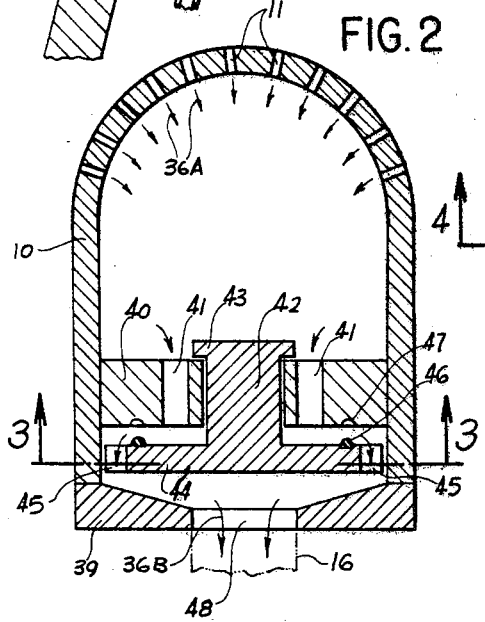
FIG. 2 is an enlargement of the water inlet diffusor in FIG. 1, shown in open-position.

FIG. 2 is an enlargement of the inlet diffuser 10 in FIG. 1 showing the one-way valve at the bottom (in open position), consisting of valve structure 40 having fluid openings 41 and circular indentations 47 on the lower side. Within structure 40 moves freely valve center structure 42 having upper discs 43 and lower valve plate 44, with side openings 45 and provided with circular rubber seal 46 to fit into indentation 47. In the open position water (arrows 36b) can enter channel 16 through opening 48 within plate 39.

Figure 2A:
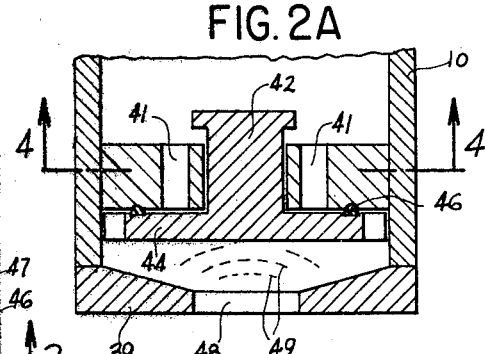
FIG. 2A shows the lower part of FIG. 2 with valve closed.

FIG. 2A shows the valve in FIG. 2 in closed position. Shock front 49 has traveled up channel 16 and presses lower valve plate 44 against valve structure 40. Rubber seal 46 is pressed into circular indentation 47 and prevents back-flow of water.

FIG. 3 is a horizontal section along line 3—3 in FIG. 2 showing lower valve plate 44 with side openings 45.

FIG. 4 is a horizontal section along line 4—4 in FIG. 2A showing valve structure 40 with fluid openings 41. In the center is shown valve center structure 42.

FIG. 5 is a vertical section through the electrode feeding system having upper plate 50 and lower plate 51. Into said plates are placed guiding pieces 52–52A and 53–53A respectively consisting of insulating material with openings 62 and 62A respectively through which moves electrode 7 in direction of arrow 63. Electrode 7 is driven by wheels 54 and 54A fastened to shafts 55 and 55A and rotating in the direction of arrows 64 and 64A respectively; the wheels are made of flexible insulating material. Into the right wheel is placed flexible contact ring 56 in such way that the wheel presses the ring against the electrode thereby providing a line contact with the electrode. Electrical current is brought into the ring through circuit 57 and contact piece 59.

FIG. 6 is a horizontal section along line 6—6 in FIG. 5 showing the two wheels 54 and 54A having indentations 60 within which fits electrode 7. Shafts 55 and 55A are connected to a motor (not shown) that drives the wheels.

FIG. 7 is a schematic figure showing two of a plurality of shock pumps 68 and 68A pumping liquid 67 out of hole 66 (e.g., coal mine shaft or ocean oil well shaft). The liquid (water) enters the lower shock pump through entrance 69 and is pumped into exit cylinders 70 and 71, connected to pipe 72 which is fastened to shaft 75 by means of flanges 74. The water then enters the next shock pump above through inlet 76 and is pumped into exit cylinders 70A and 71A. Thence it is forced into pipe 72 and flows upwards in direction of arrow 73.

The preferred embodiment of the invention is shown in FIG. 8 (this is a vertical section through the lower shock pump in FIG. 7) the main parts of which are; inlet channel 69, main channel 100, piston cylinder 116, and exit cylinders 70 and 71. Descending from the top is shaft 75A flanged to pump shaft 75 by flanges 88, 88A and screws 89. The shafts have interior opening 98 into which is placed electrical supply line 90 which connects to generator-capacitor unit 108 (not shown). The pump shaft 75 widens at its lower portion 96. At this point it is connected to main cylinder 100 by spokes 97 and 97A. The shaft ends in flange 99 which is attached to conical structure 102 by screws 109. Structure 102 has borings 103 and 103A which connect to center boring 104. At this level the main channel 100 is widened so as to produce inlet channels 101 and 101A which are welded into piston cylinder 116. Running within cylinder 116 are pistons 107 and 107A having grids 111 and 111A, main condensing channels 112 and 112A, over pressure borings 113 and 113A, and piston rings 114 and 114A respectively. Between pistons 107 and 107A is shock chamber 132 into which are placed two electrodes of which electrode 106A is shown with supporting structure 105A; the pistons move to the left or right and are stopped by stopping rings 115 and 115A respectively.

The piston cylinder is flanged at left and right to exit cylinders 70 and 71 by means of flanges 117, 118 and screws 119 and flanges 117A, 118A and screws 119A respectively.

Into the exit cylinders are placed one-way ball valves 80 and 81 shown in vertical section at the left. The ball valves consist of valve structure 82 having lower opening 83, upper opening 84 and internal opening 87. Placed into the internal opening is sphere 85 closing the lower opening at times of no discharge.

When a discharge occurs the pistons move to the left and right and sphere 85 will be pressed up against structure 86.

Arrows 127 indicate the direction of water flow. Water enters the pump through entrance 69 (arrow 127) and flows into the main channel in which is a one-way valve consisting of upper valve part 92 having a conical entrance 91 and lower (freely movable) valve part 93 around which water can flow (arrows 127A) in open position. The lower valve part is stopped by stopping ring 95; this valve closes when pistons move to left and right. The water then enters inlet channels 101 and 101A (arrows 127B). A small portion will flow through borings 103, 103A and 104 (arrow 127C) to condense steam and fill up shock chamber 132. When the pistons are driven by the discharge to the left and right they force the water in the direction of arrows 127D, through the ball valves into exit cylinders 70 and 71 (arrows 127E). When channels 112 and 112A of pistons 107 and 107A have passed the inlet openings 101 and 101A water will flow through them into the shock chamber condensing the steam therein, allowing the pistons to return to the position shown.

For better rigidity spokes 120 and 120A are placed between the exit cylinders and main channel 100. They are attached to these cylinders by flanges 121 and 122 and screws 123 and 124 and flanges 121A and 122A and screws 123A and 124A respectively.

FIG. 9 is a vertical section along line 9—9 in FIG. 8 showing the two electrodes 106 and 106A held by supporting structures 105 and 105A made of insulating material; the electrodes are connected to electrical contact 129, and are supplied with electrical energy through line 128 which in turn connects to electrical supply line 90 (shown in FIG. 8). The electrode holding and feeding means described in FIGS. 1 and 5, and FIGS. 14–16 may obviously be substituted and used in this shock pump.

FIG. 10 is a horizontal section along line 10—10 in FIG. 8 showing the widened portion of main channel 100 which leads inlet channels 101 and 101A around conical structure 102.

FIG. 11 is a vertical section along line 11—11 in FIG. 8 showing grid 111 at the side of piston 107 facing the shock chamber; the grid consists of vertical spokes 130 leaving free openings 131 through which water can flow.

FIG. 12 is a horizontal section along line 12—12 in FIG. 8 showing the position of spokes 130A and main condensing channel 112A within piston 107A.

FIG. 13 is a horizontal section along line 13—13 in FIG. 8 showing the connection of main channel 100 to exit cylinders 70 and 71 by spokes 120 and 120A respectively. Entrance 69 is seen from below.

Figure 14:
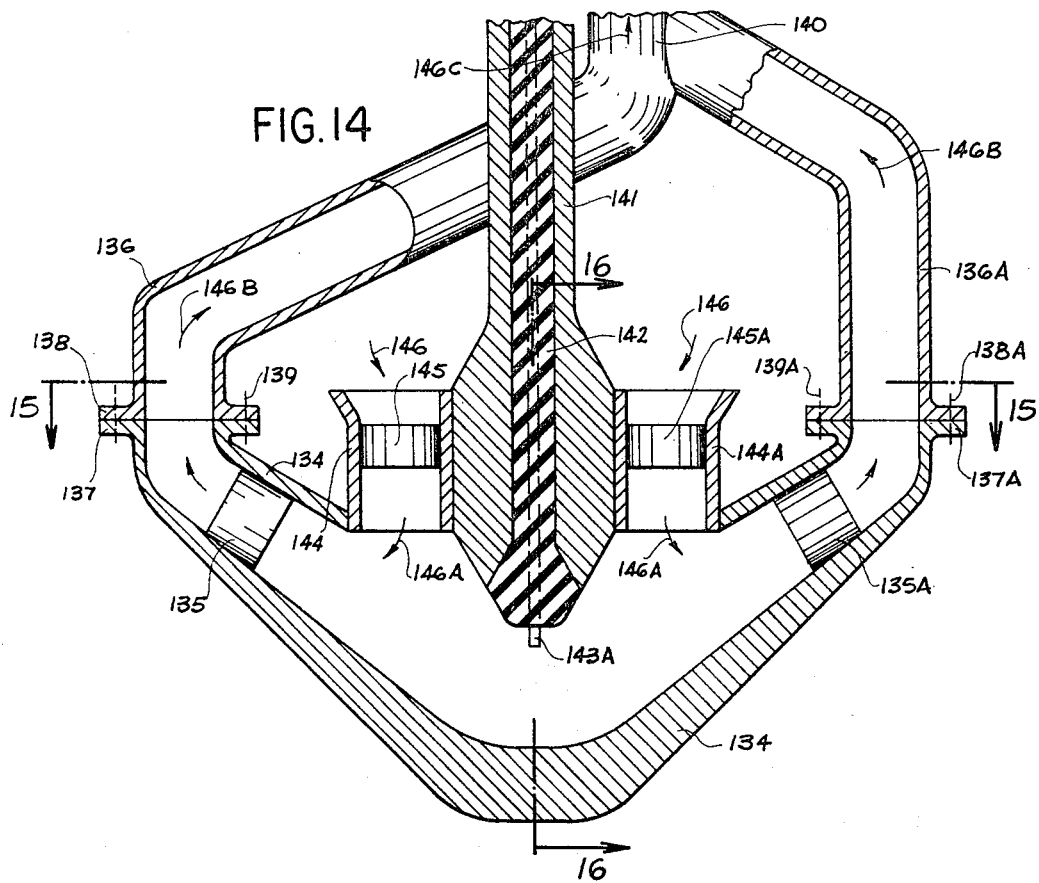
FIG. 14 shows a modification of the shock pump, i.e. a pistonless device in which the fluid is driven by the force of the shock front produced by the discharge.

FIG. 14 shows a modification, a pistonless shock pump in which the fluid is driven directly by the shock front. The vertical section shows the shock chamber 134 into which are placed at the left and right one-way valves (e.g., such as valves 80 and 81 in FIG. 8) 135 and 135A respectively. The shock chamber is connected to exit cylinders 136 and 136A by flanges 137 and 138 and screws 139 at the left and flanges 137A and 138A and screws 139A at the right: the two exit cylinders join to form main exit channel 140.

Reaching into the shock chamber from the top is shaft 141 having core 142 into which are placed the two electrodes of which electrode 143A is shown. In addition, inlet cylinders 144 and 144A lead into the shock chamber. Placed into said cylinders are one-way valves 145 and 145A of the type shown in main channel 100 of FIG. 8.

Water enters these cylinders (arrows 146), flows into the shock chamber (arrows 146A) and is driven into the exit cylinders (arrow 146B) and the main exit channel (arrow 146C) by the shock front, all components functioning like those in FIG. 8 except that vapor is condensed by the direct flow of liquid into shock chamber 134 instead of by indirect flow through pistons 107 and 107A in FIG. 8.

Figure 15:
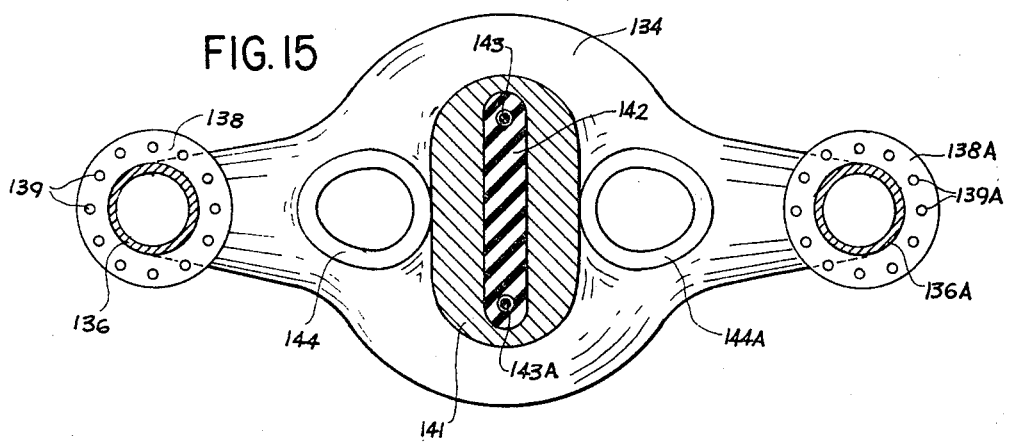
FIG. 15 is a horizontal section along line 15—15 in FIG. 14 showing the shape of the discharge chamber and the relative position of the exit channels.

FIG. 15 is a horizontal section along line 15—15 in FIG. 14 showing the shape of shock chamber 134 and shaft 141, which has cone 142 of insulating material through which electrodes 143 and 143A penetrate.

FIG. 16 is a vertical section along line 16—16 in FIG. 14 showing electrode channels 149 and 149A within the core 142 through which are fed electrodes 143 and 143A respectively; these electrodes consist of sections joined by connections 150. At the lower portion of the electrode channels are guiding sections 133 and 133A which allow the accurate positioning of the electrodes.

FIG. 17 shows a part of electrode channel 149 containing electrode sections 143; these electrode sections have to be joined by electrically conducting connections. The upper portion of the figure shows a general connection 151 consisting of flexible conducting material. The lower portion shows a special modification of the connection consisting of a circular wire grid 151A placed around the two ends of the electrode sections.

FIG. 18 is an elevation and sectional view of another modification of the shock pump shown in the horizontal plane. This modification has shock chambers 156, 157 and 158, piston cylinders 152, 153 and 154 at the left and piston cylinders 152A, 153A and 154A at the right. Around the cylinders are placed cooling coils 159, 160 and 161 at the left and 159A, 160A and 161A at the right. The cylinders connect to pumping cylinders 162, 163 and 164 at the left and pumping cylinders 162A, 163A and 164A at the right. Into the cylinders are placed inlet channels 165, 166 at the left and 165A, 166A at the right (inlet channels 167 and 167A for the bottom cylinder are not shown). Said pumping cylinders connect to collecting chambers 168 at the left and 168A at the right; these collecting chambers connect to outlet channels 169 and 169A respectively. The lower cylinder is cut in the horizontal plane and shows electrode 170, shock cavity 171 and shock piston 172 having buffer region 173 and driving piston 174 on the left and shock piston 172A having buffer region 173A and driving piston 174A at the right. Placed into the pumping cylinders are one-way ball valves consisting of inner plate 176 with opening 177, sphere 178 and outer plate 180 with opening 179 at the left, and inner plate 176A with opening 177A, sphere 178A and outer plate 180A with opening 179A at the right.

Between the driving pistons and the ball valves are pumping ranges 175 and 175A respectively.

Figure 19:
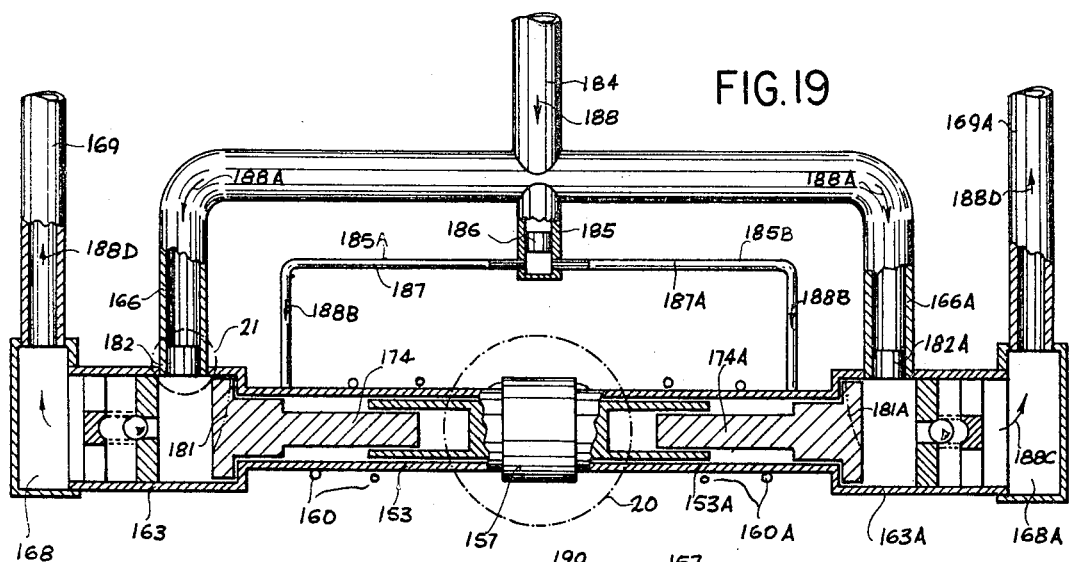
FIG. 19 is a vertical section along line 19—19 in FIG. 18 showing the water supply and exit system.

FIG. 19 is a combination elevation and sectional view along line 19—19 in FIG. 18 showing the water supply and exit system. Water (arrow 188) enters the system through main line 184; it divides into primary flow (arrows 188A, the part to be pumped) entering channels 166 and 166A, and secondary flow channels 187 and 187A (the coolant water which also supplies the shock chamber) entering distribution channel 185 and pipes 185A–185B. Into channel 185 is placed one-way valve 186 preventing flow-back of water from the cooling coils. This secondary flow enters channels 187 and 187A (arrows 188B) thence into cooling coils 160 and 160A respectively (see FIG. 20). The primary flow enters pumping cylinders 163 and 163A through valves 182 and 182A respectively. It is force pumped through the ball valves into exit channels 169 and 169A (arrows 188D) by driving pistons 174 and 174A.

As a modification for the driving pistons end plates of pistons 174 and 174A may have center indentations shown by phantom lines 181 and 181A. Although less water may be pumped, the pistons will return more easily to their discharge-positions by the water flowing down channels 166 and 166A. A compromise will probably make the most efficient over-all pump.

Figure 20:
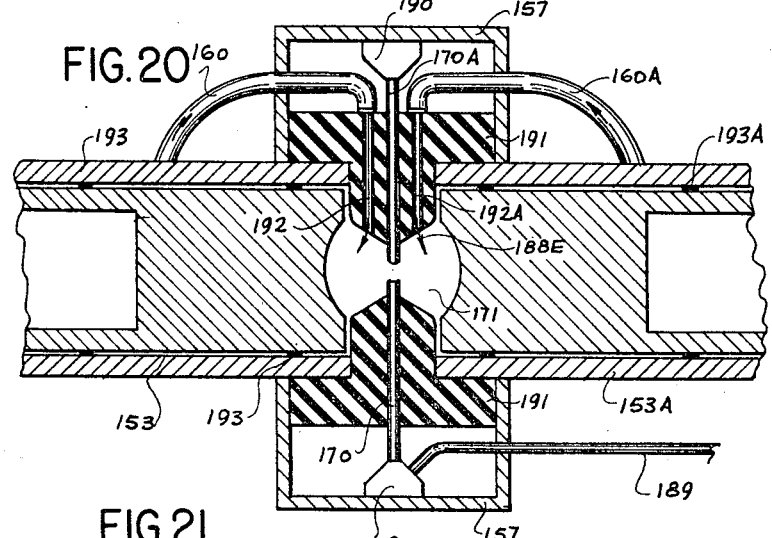
FIG. 20 is an enlargement of section 20 in FIG. 19 showing the tube discharge chamber and the arrangement of the two electrodes.

FIG. 20 is an enlargement of section 20 in FIG. 19 showing shock chamber 157 into which water is led from cooling coils 160 and 160A; it then flows through channels 192 and 192A (arrows 188E) into shock cavity 171; within chamber 171 and around cylinders 153 and 153A is center structure 191 of insulating material, through which penetrate electrodes 170 and 170A which connect to contact ring 190; this ring is supplied with electrical current through line 189 connecting to a generator-capacitor unit (not shown). Around the shock pistons at left and right are placed piston rings 193 and 193A respectively.

Figure 21:
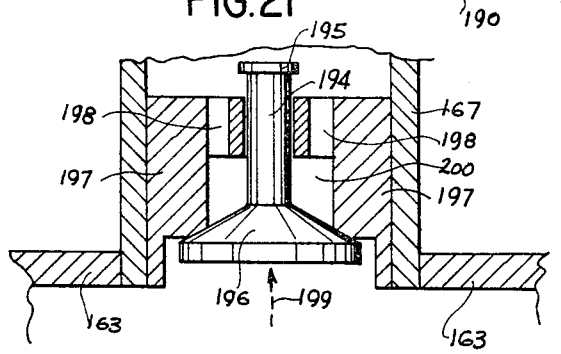
FIG. 21 is an enlargement of section 21 in FIG. 19 showing the water inlet valve.

FIG. 21 is an enlargement of section of 21 in FIG. 19 showing the inlet valve in the closed position, i.e. at the moment when water is pumped; this valve consists of valve structure 197 with central opening 200 and fluid openings 198. Within opening 200 valve part 194 moves freely; this part 194 has upper stopping plate 195 and conical valve plate 196 below. Plate 196 closes central opening 200 when pressure (arrow 199) is applied at the moment of current discharge in shock cavity 171 (FIG. 20).

I claim:
1. In a shock pump having housing means and activated by a spark discharge across the spark gap between two electrodes immersed in a liquid substantially filling the shock chamber surrounded by the housing means, the discharge vaporizing a quantity of said liquid, the improvement which comprises:
   inlet channels into the housing means proximate the shock chamber and having one-way valves to prevent back-flow of liquid therethrough during a spark discharge;
   leading from the housing means liquid outlet channels having one-way valves to prevent back-flow of liquid therethrough before and after the spark discharge;
   piston means disposed within the housing means adjacent to and helping to define the shock chamber, and movable outward therefrom when forced out by the expansion of vaporized liquid;
   condensing channels penetrating said piston means with one end positioned to be aligned briefly with one of said inlet channels after a spark discharge to let cooling water into the shock chamber to condense the vapor therein and permit the return of the piston means to its original position, this return being also assisted by pressure of liquid from said inlet means on the side of said piston means opposite the shock chamber.

2. In combination the shock pump improved as described in claim 1, and additional channel means leading from said inlet channels through the walls of said housing means directly into said shock chamber to expedite condensation of vapor by letting cool liquid into the shock chamber immediately after each spark discharge, and to help replenish lost liquid within the shock chamber before the next spark discharge.

3. In combination the shock chamber improved as described in claim 1, and an electrode improvement comprising:

two electrode channels made of insulating material penetrating said housing means and supported by structures attached thereto, and a plurality of electrodes disposed lengthwise in each electrode channel and joined end to end by electrically conductive flexible connecting means, the lower electrodes in the two electrode channels being positioned accurately to form a spark gap between the ends thereof and being replaceable as desired by the next electrode to facilitate continuous pump operation without long interruptions.

4. In a pistonless shock pump activated by a spark discharge across the spark gap between two electrodes penetrating the walls of the pump housing means into a shock chamber inclosed therein, each spark discharge vaporizing a quantity of the liquid which substantially fills the shock chamber, the improvement which comprises:

one-way valves within openings leading from a liquid source into said shock chamber to prevent liquid from flowing out during said spark discharge;

outlet channel means leading from said shock chamber and having one-way valve means to prevent backflow of liquid into the shock chamber before and after said spark discharge;

both the inlet opening and valve being positioned to permit immediate flow of cool liquid into the shock chamber after each spark discharge to condense the vapor therein and permit immediate filling of the spark chamber with liquid preparatory to the next spark discharge which will again vaporize some of the liquid, the expansion driving a quantity of the other liquid from the shock chamber through said outlet channel means; and electrode channels of insulating material leading into said shock chamber through the walls of said housing means and supported by structures attached thereto, each electrode channel holding a plurality of electrodes joined end to end by flexible electrically conductive connecting means between each two successive electrodes, the lower electrode in each channel being positioned accurately with respect to the other to form a spark gap and being easily replaceable by the next electrode to facilitate continuous pump operation without long interruptions.

References Cited

UNITED STATES PATENTS

| | | | |
|---|---|---|---|
| 3,141,296 | 7/1964 | Jacobs et al. | 103—255 XR |
| 3,185,106 | 5/1965 | Smith | 103—255 |
| 3,285,001 | 11/1966 | Turnblade | 103—1 XR |

ROBERT M. WALKER, *Primary Examiner.*